J. W. WINTERS.
PEANUT HARVESTER.
APPLICATION FILED MAR. 9, 1916.

1,193,746.

Patented Aug. 8, 1916.
4 SHEETS—SHEET 1.

Witnesses

Inventor
John W. Winters
By
Attorney

J. W. WINTERS.
PEANUT HARVESTER.
APPLICATION FILED MAR. 9, 1916.

1,193,746.

Patented Aug. 8, 1916.
4 SHEETS—SHEET 2.

Inventor
John W. Winters

Attorney

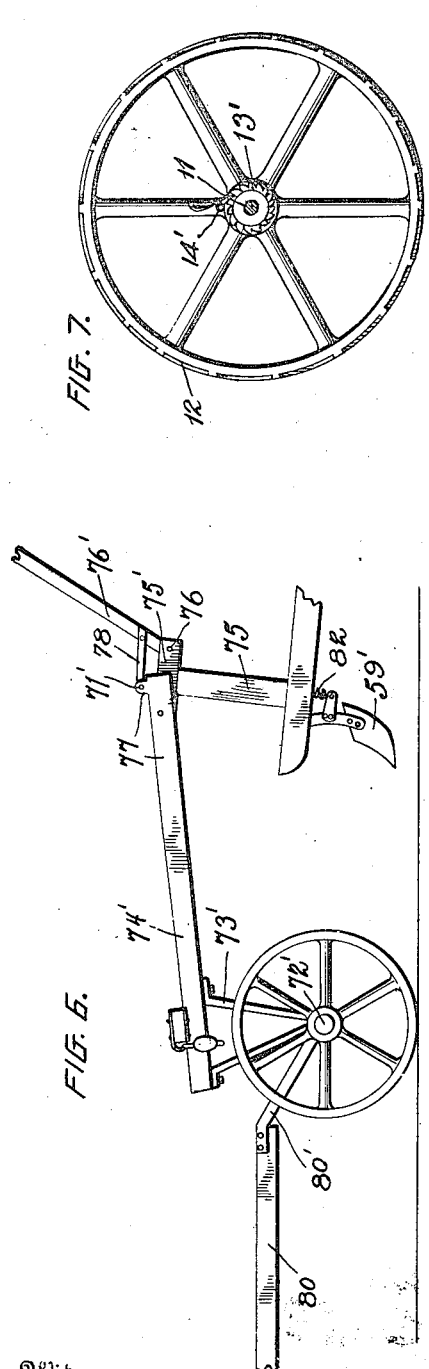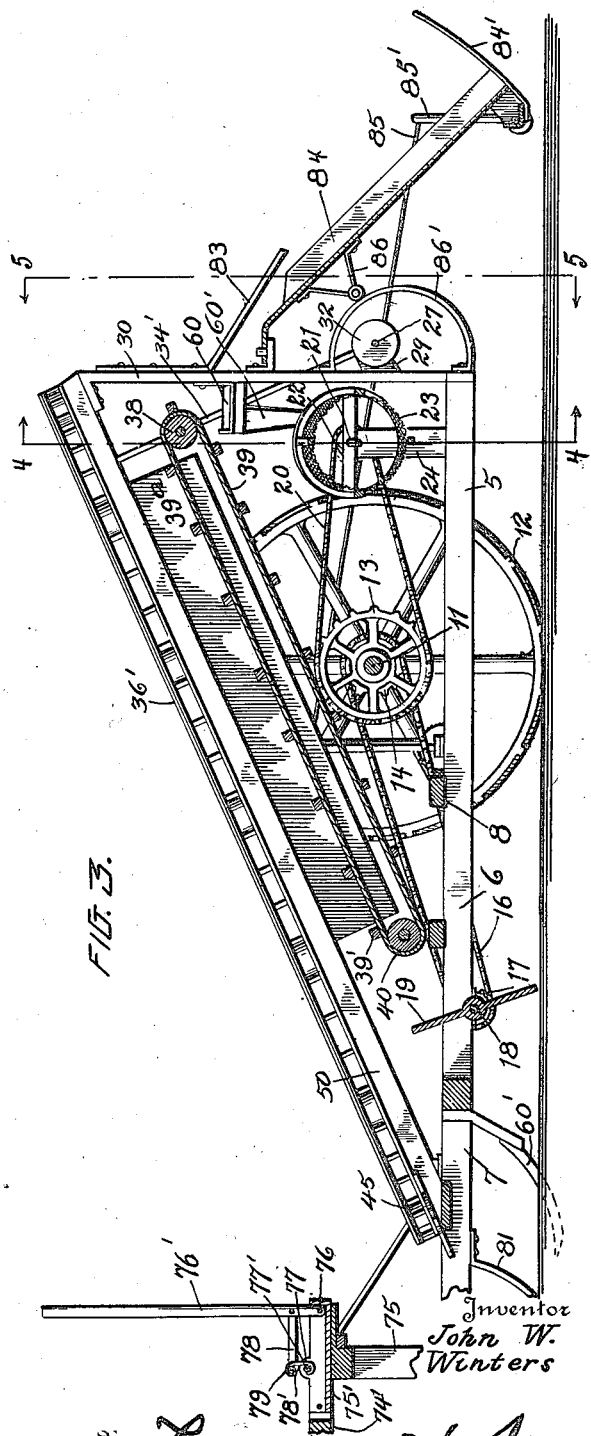

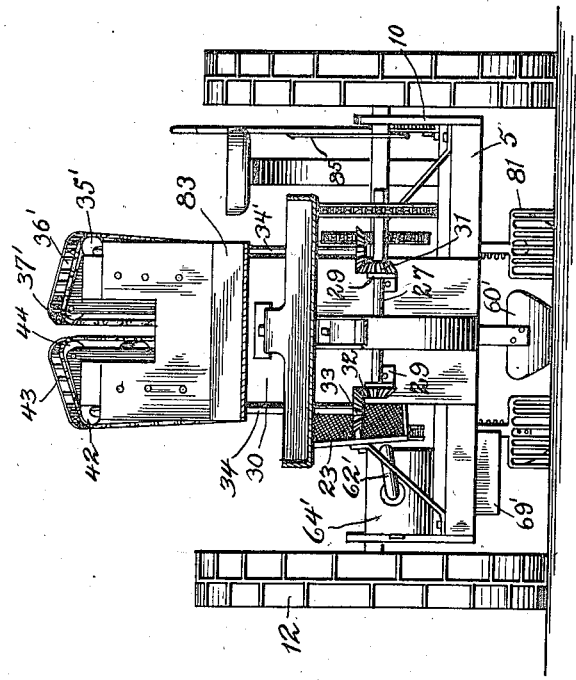

UNITED STATES PATENT OFFICE.

JOHN WILLIAM WINTERS, OF STEPHENVILLE, TEXAS, ASSIGNOR TO CALVIN C. WINTERS, OF STEPHENVILLE, TEXAS.

PEANUT-HARVESTER.

1,193,746.  Specification of Letters Patent.  Patented Aug. 8, 1916.

Application filed March 9, 1916. Serial No. 83,154.

*To all whom it may concern:*

Be it known that I, JOHN W. WINTERS, a citizen of the United States, residing at Stephenville, in the county of Erath and State of Texas, have invented certain new and useful Improvements in Peanut-Harvesters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in agricultural implements and it relates more particularly to that class of machines known as peanut harvesters.

One of the objects of the invention is to provide a machine of this character which will plow the vines from the ground and deliver the same to the rear of the machine.

Another object of the invention resides in the provision of means for beating the dirt from the vines before they enter the machine and also in the provision of means for gripping the vines during their travel through the machine to hold the same rigid while they pass rearwardly.

A further object of the invention is to provide means for catching the peanuts that drop from the vines during their travel rearwardly and in the provision of means for sieving such peanuts, thereby separating the same from any foreign matter.

A further object of the invention is to provide means for receiving the peanuts after they have fallen from the vines and delivering the same to the sieving mechanism.

A still further object of the invention is the provision of means for moving the forward portion of the machine into and out of engagement with the ground surface.

My invention consists in the provision of a machine of this character, which will be automatic in its operation and easy to repair, having various details of construction, combinations and arrangements of parts which will be hereinafter fully described, shown in the accompanying drawings and then specifically defined in the appended claims.

Figure 1:
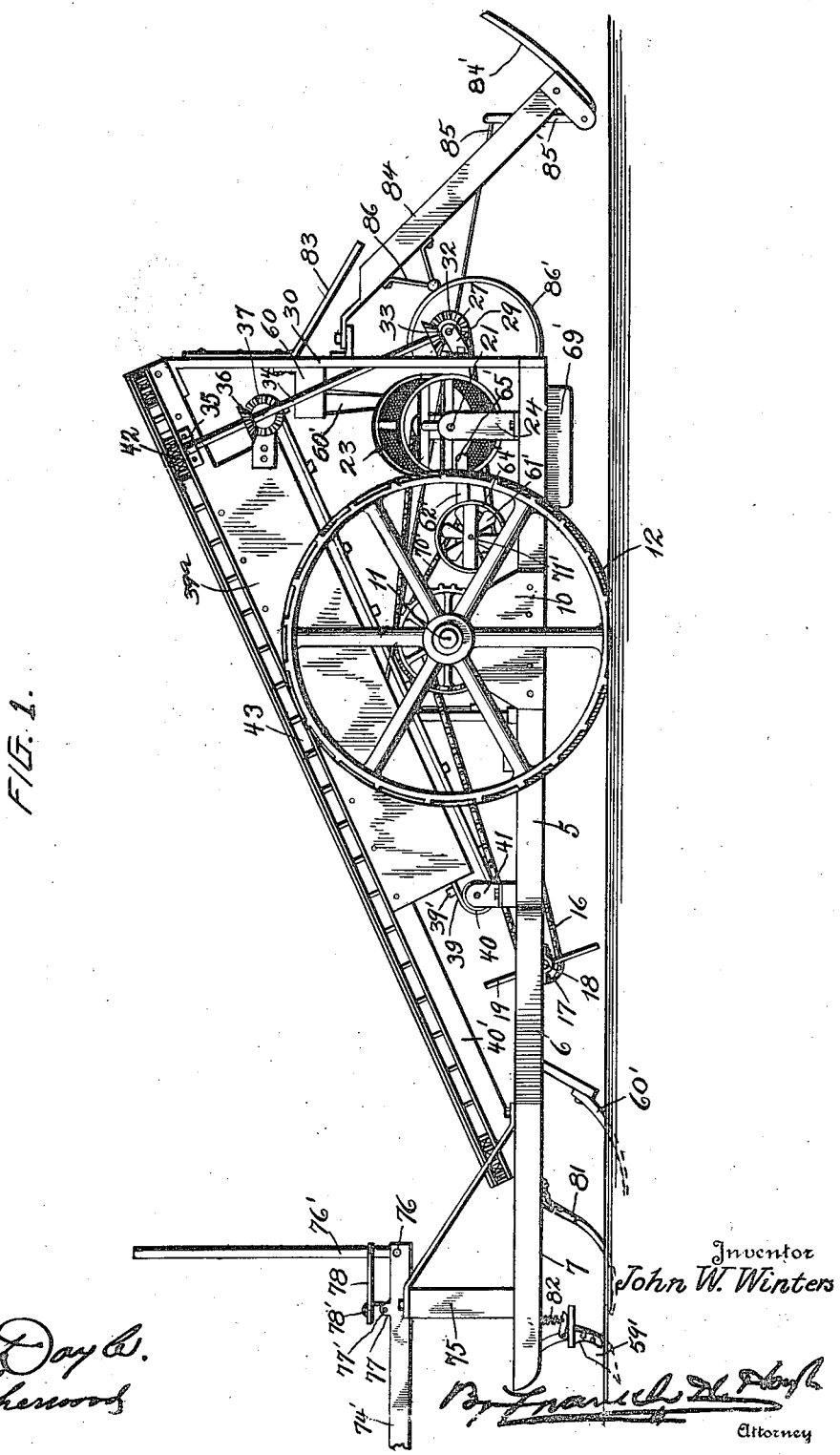
Figure 2:
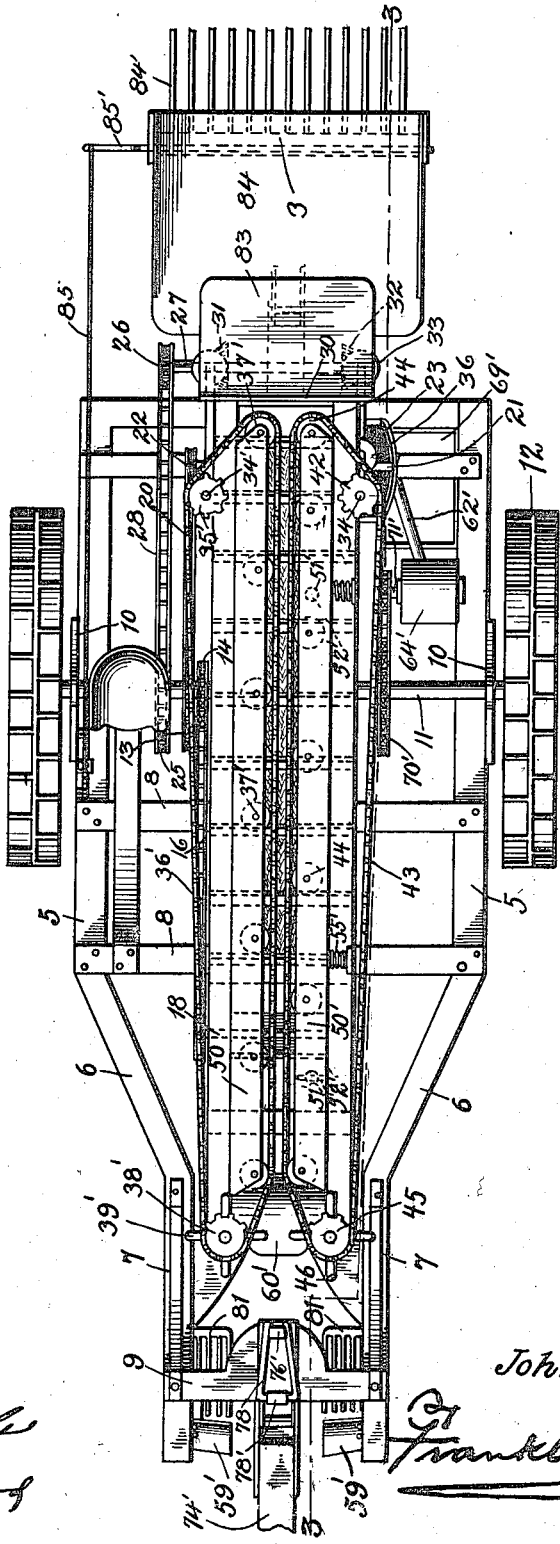

I illustrate my invention in the accompanying drawings, in which:

Figure 1 is a side elevational view of a machine constructed in accordance with my invention. Fig. 2 is a plan view. Fig. 3 is a longitudinal sectional view taken on line 3—3 of Fig. 2. Fig. 4 is a transverse sectional view taken on line 4—4 of Fig. 3. Fig. 5 is a sectional view taken on line 5—5 of Fig. 3. Fig. 6 is a detail view of the truck which supports the forward portion of the machine, and Fig. 7 is a detail view of one of the wheels.

Referring more specifically to the drawings, 5 represents the frame of the machine, which is substantially rectangular in shape, the forward ends thereof converging as at 6 and terminating in substantially straight portions 7. Brace bars 8 connect the side bars of the frame adjacent to the central portion thereof, while the brace bar 9 connects the extreme forward portions 7 of the frame and holds the side bars rigid.

Rigidly secured to the side bars 5 of the frame, adjacent the rear thereof, are upwardly extending bearing plates 10 in which operates the supporting axle 11, on each end of which operates a driving wheel 12, which wheels are clutched to said axle by the ratchet wheel 13′ and the dog 14′ shown clearly in Fig. 7, the dog 14′ being operated by suitable mechanism not shown whereby the wheels 12 may be thrown into and out of operative relation with said axle 11.

The gear wheel 13 is keyed to said shaft 11 and carries a gear wheel 14 therewith, the teeth of said gear wheel 14 being adapted to engage the links of chain 16 which also moves around the substantially small gear wheel 17, secured to one end of the shaft 18 which is supported adjacent to the forward end of the frame, and carries rotating beating members 19, the utility of which will be hereinafter more clearly set forth.

The chain 20 travels over the gear wheel 13 and communicates movement thereof to the shaft 21 through the medium of gear wheel 22, which imparts a rotary movement to the cylindrical sieving element 23, the same being supported at an angle with relation to the frame 5 by the brackets 24. A gear wheel 25 is also supported on the main shaft 11 and communicates rotary movement to the gear wheel 26, carried on one end of the stub shaft 27, through the medium of the chain 28, said stub shaft being supported by brackets 29 rigidly secured to the upright member 30 extending upwardly from the rear portion of the frame.

The stub shaft 27 is provided with beveled gears 31 and 32, the beveled gear 32 meshing with the teeth of the beveled gear 33 carried on one end of the shaft 34, which is supported by a bracket 35 and is provided with a second beveled gear 36, which is keyed thereto adjacent its upper end, and meshes with the beveled gear 37 carried on one end of the roller 38 for communicating rotary movement thereto, the rotary movement of said roller 38 being imparted to an endless belt 39 carrying transverse bars 39'. Said belt 39 also extends over a similar roller 40 supported by brackets 41 which are bolted to the side bars of the frame 5. Guard plates 39ᵃ depend from the under side of the bars 50 and 50', said plates being in a plane adjacent to the edges of the belt 39 and prevent the peanuts carried thereby from falling laterally therefrom.

The extreme upper end of the shaft 34 carries a gear wheel 42 which meshes with an endless carrier chain 43, traveling over rollers 44 and communicates rotary movement to the gear wheel 45 which also carries gripping fingers 46. Arranged in parallel relation with the shaft 34 is a shaft 34' which is provided at its upper end with a gear wheel 35' meshing with and communicating rotary movement to the endless carrying chain 36', extending over rollers 37' and engaging the teeth of the gear wheel 38' which also carries gripping fingers 39' which are timed with relation to the gripping fingers 46, whereby the gripping fingers 46 and 39' operate in unison.

Supported by the frame 5 and arranged at an angle with relation thereto are the supporting members 40' disposed in parallel relation, and spaced apart to provide a clearance between the carrying chains 43 and 36' which, as before stated, operate over rollers 44 and 37' respectively, the roller 37' being supported by the bar 50, while the rollers 44 are supported by the bar 50' which is provided in its under side with transverse slots 51' which accommodate upwardly extending pins 52', whereby it will be seen that the bar 50' is permitted to move laterally with relation to the bar 50, the lateral movement of the bar 50' being restricted by the tension of the coiled springs 55' which normally hold the supporting bars 50 and 50' in suitable parallel relation.

From the foregoing, it will be seen that movement of the bar 50' with relation to the stationary bar 50 will compensate for vines of different sizes which insures the machine against stopping, caused by the jamming of the vines between the carrier chains 43 and 36'.

Disposed adjacent to the forward end of each of the straight portions 7 is a plow blade 59' which breaks up the earth at the sides of the plants and cuts the lateral roots, which, to a degree, loosen the plants, while the plow blade 60', which is preferably of the shovel type, cuts the central or tap root of the vine, whereupon the vine is in a position to be grasped by the fingers 39' and 46 to be delivered to the carrier chains.

Positioned directly under the roller 38 is a trough-shaped member 60, arranged at an angle, whereby material falling into said trough 60 will gravitate to the spout 60', which has one of its ends in communication with the lower end of the trough 60, the opposite end extending into the cylindrical element 23 whereby the articles are delivered to the sieving element which, due to the inclined position in which the same is supported, delivers the articles to a receiving box 69' positioned directly under one end of the member 23, and it will be seen that the rotation of said element 23 thoroughly sieves the articles and frees the same from all heavy substances, all hulls or other dry particles being blown through the sieve 23 by means of a rotary fan blower 61' which is suitably supported adjacent the lower end of the sieve 23, and in communication therewith through the medium of the spout 62' which has one of its ends connected to the fan casing 64', the opposite end 65' thereof being disposed within the sieve 23.

The fan blower 61' is rotated by means of chain 70' operating on a suitable gear wheel keyed, or otherwise fixed, to the main shaft 11 and fan shaft 71' respectively.

As clearly shown in Fig. 6, the forward portion of the machine is supported by the auxiliary truck comprising the axle 72' supported in suitable brackets 73', which are bolted to and depend from the bars 74', the rear end thereof being pivotally connected with the upright members 75, which extend upwardly from the forward end of the machine through the medium of the bar 75', one end of the latter extending rearwardly and provided with an aperture through which a bolt 76 passes, forming the fulcrum for the operating lever 76'.

Ears 77 extend upwardly from the rear of the bars 74' and form bearings for the pin 77' which is connected to the operating lever 76' by means of a stub arm 78 and link members 78', the lower hooked portion thereof gripping the pin 77' while the upper hooked portion thereof grips the pin 79 carried by the stub arm 78.

From the foregoing, it will be seen that, when the lever 76' is in the position shown in Fig. 3, the plows 59' and 60' are in engagement with the ground surface, or in a position to remove the plants. When the lever 76' is in the position shown in Fig. 6, the plows are in raised positions and the machine may be moved from one field to another.

Secured to the forward portion of the auxiliary frame is the usual draft tongue 80 and connecting bars 80'. Rigidly supported by the forward portions 7 of the frame are the forked members 81 which engage the vines and bunch the same whereby they are picked up by the gripping fingers 46 and 39'. It might further be stated that the plow elements 59' are pivotally supported by the frame and held to their operative position by the coiled springs 82. After the peanut vines travel the length of the carrier chains 43 and 36', they are automatically fed through the rear of the machine and to a substantially flat chute 83 before the same are delivered to the auxiliary chute 84 where they gravitate to the hinged forked member 84' which is normally held in an upwardly inclined position, as shown in Fig. 3, where they are held until the operator moves the forked member 84' to a position parallel to the ground surface, which movement is accomplished by the movement of the rod 85 having connection with the forked member 84' through the medium of vertically extending rod 85'. The member 84 is supported by bracket member 86 which rests on the curved bracket member 86'.

The operation of the device is as follows:—The machine having been positioned in a field whereby the plows 59' straddle a row of vines, the machine is moved along the row with the result that the plow 60' cuts the central roots of the vines whereupon the vines fall between the endless carrier chains 43 and 36', where they are delivered to the rear of the machine, the transverse bars 39' catching any peanuts that fall from the vines on their travel rearwardly. The peanuts are then delivered to the trough 60 from where they pass to the cylindrical sieving element 23, where they are freed of all foreign substances, the vines passing through the rear of the machine into the trough 84 and delivered to the forks 84'.

What I claim to be new is:—

1. In a peanut harvester, a frame, endless carrier chains supported by the frame, plows for dislodging vines from the earth and feeding the same to the carrier chains, means for removing dirt from the vines, means operating under the carrier chains for catching peanuts which fall from the vines, means for sieving said peanuts, and means for moving the plows into and out of engagement with the ground surface.

2. In a peanut harvester, a frame, endless carriers, means for supporting the endless carriers on the frame, means for dislodging vines from the ground, means for feeding the vines to the carriers, means for beating the earth from the roots of the vines, means for catching peanuts which fall from the vines, and means for sieving said peanuts.

3. In a peanut harvester, a frame, means carried by the frame for dislodging vines from the earth, endless carrier chains operating in parallel relation and adapted to grip the vines therebetween, an endless belt operating under the chains and carrying transverse bars for catching peanuts which fall from the vines during the passage of the vines to the rear of the machine, sieving means, said belt adapted to deliver peanuts to the sieving means, and means for operating the endless carrier chains, endless belt and sieving means.

In testimony whereof I hereunto affix my signature in presence of two witnesses.

JOHN WILLIAM WINTERS.

Witnesses:
J. B. KEITH,
P. L. PITTMAN.